(12) United States Patent
Xu et al.

(10) Patent No.: US 8,785,065 B2
(45) Date of Patent: Jul. 22, 2014

(54) CATALYST FOR GENERATING HYDROGEN AND METHOD FOR GENERATING HYDROGEN

(75) Inventors: Qiang Xu, Ikeda (JP); Sanjay Kumar Singh, Ikeda (JP); Ashish Kumar Singh, Ikeda (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 0 days.

(21) Appl. No.: 13/607,093

(22) Filed: Sep. 7, 2012

(65) Prior Publication Data

US 2013/0059217 A1 Mar. 7, 2013

(30) Foreign Application Priority Data

Sep. 7, 2011 (JP) .................................. 2011-195165

(51) Int. Cl.
| | | |
|---|---|---|
| *B01J 23/74* | (2006.01) | |
| *B01J 23/745* | (2006.01) | |
| *B01J 23/755* | (2006.01) | |
| *H01M 8/06* | (2006.01) | |
| *C01B 3/04* | (2006.01) | |
| *B01J 35/00* | (2006.01) | |

(52) U.S. Cl.
CPC ............ *B01J 23/755* (2013.01); *H01M 8/0606* (2013.01); *Y02E 60/50* (2013.01); *C01B 3/04* (2013.01); *Y02E 60/364* (2013.01); *B01J 35/0013* (2013.01)
USPC ............................ 429/416; 502/337; 502/338

(58) Field of Classification Search
None
See application file for complete search history.

(56) References Cited

U.S. PATENT DOCUMENTS

| | | | |
|---|---|---|---|
| 6,358,488 B1 | 3/2002 | Suda | |
| 2003/0091879 A1* | 5/2003 | Rusta-Sellehy et al. | ........ 429/20 |
| 2005/0106430 A1* | 5/2005 | Yamada et al. | ................. 429/21 |
| 2010/0167175 A1* | 7/2010 | Dopp et al. | ................... 429/516 |
| 2011/0129743 A1* | 6/2011 | Xu et al. | ....................... 429/416 |

FOREIGN PATENT DOCUMENTS

| | | | |
|---|---|---|---|
| JP | 2001-019401 A | 1/2001 | |
| JP | 2002-241102 A | 8/2002 | |
| JP | 2003-040602 A | 2/2003 | |
| JP | 2004-244251 A | 9/2004 | |
| JP | 2006-213563 A | 8/2006 | |
| JP | 2007-269514 A | 10/2007 | |
| JP | 2007-269529 A | 10/2007 | |

OTHER PUBLICATIONS

Z. P. Li. et al, "Evaluation of alkaline borohydride solutions as the fuel for fuel cell", Journal of Power Sources vol. 126, pp. 28-33, (2004).

(Continued)

*Primary Examiner* — Ula C Ruddock
*Assistant Examiner* — Matthew Van Oudenaren
(74) *Attorney, Agent, or Firm* — Westerman, Hattori, Daniels & Adrian, LLP

(57) ABSTRACT

The present invention provides a catalyst for generating hydrogen, containing a composite metal of iron and nickel, the catalyst used in a decomposition reaction of at least one compound selected from the group consisting of hydrazine and hydrates thereof; and a method for generating hydrogen, including contacting the catalyst for generating hydrogen with at least one compound selected from the group consisting of hydrazine and hydrates thereof. According to the invention, hydrogen can be efficiently generated with improved selectivity in the method for generating hydrogen that utilizes the decomposition reaction of hydrogen.

8 Claims, 3 Drawing Sheets

(56) References Cited

OTHER PUBLICATIONS

M. M Chandra et al, "A high-performance hydrogen generation system: Transition metal-catalyzed dissociation and hydrolysis of ammonia-borane", Journal of Power Sources vol. 156, pp. 190-194, (2006).

Q. Xu et al, "Catalytic activities of non-noble metals for hydrogen generation from aqueous ammonia-borane at room temperature", Journal of Power Sources vol. 163, pp. 364-370, (2006).

S. C. Amendola et al, "A safe, portable, hydrogen gas generator using aqueous borohydride solution and Ru catalyst", International Journal of Hydrogen Energy vol. 25, pp. 969-975, (2000).

S. K. Singh et al, "Room-Temperature Hydrogen Generation from Hydrous Hydrazine for Chemical Hydrogen Storage", Journal of American Chemical Society vol. 131, No. 29, pp. 9894-9895, (2009).

\* cited by examiner

CATALYST FOR GENERATING HYDROGEN AND METHOD FOR GENERATING HYDROGEN

BACKGROUND OF THE INVENTION (1) Field of the Invention

The present invention relates to a catalyst for generating hydrogen and a method for generating hydrogen.

(2) Description of the Related Art

Various methods are known for generating hydrogen gas to be supplied to fuel cells. Examples of such methods include the electrolysis of water; reactions between metals and acids; reactions of water with metal hydrides; the steam reforming of methyl alcohol or natural gas; and the release of hydrogen from hydrogen storage materials, such as hydrogen storage alloys, activated carbon, carbon nanotubes, and Li—N materials. However, these methods have drawbacks in which much energy is required to generate hydrogen, the amount of hydrogen generated is small relative to the amount of starting materials used, large-scale equipment is required, etc. For this reason, although these methods are applicable to hydrogen generation on an industrial scale or on a laboratory scale, they are not suitable for use in supplying hydrogen to fuel cells for automobiles, portable fuel cells for, for example, cellular phones and personal computers, and the like, which require a continuous supply of necessary amounts of hydrogen fuel, and for which there is a demand for miniaturization.

Metal hydrides, such as $LiAlH_4$ and $NaBH_4$, are used as hydrogen-generating reagents in laboratories and the like. These compounds need to be handled carefully because they rapidly release a large amount of hydrogen upon contact with water, producing an explosive phenomenon. For this reason, these compounds are also not suitable for use as hydrogen supply sources for the fuel cells mentioned above.

Methods for releasing hydrogen by utilizing hydrolysis reactions of tetrahydroborates, such as $NaBH_4$ (see, e.g., Patent Literature 1 and 2, and Non-Patent Literature 1 and 2 listed below), and hydrolysis reactions of ammonia borane represented by the chemical formula $NH_3BH_3$ (see, e.g., Patent Literature 3, and Non-Patent Literature 3 and 4), have also been reported. However, these methods have problems related to the recovery and regeneration of the resulting borate compounds.

Hydrazine ($H_2NNH_2$), which is liquid at room temperature and has a high hydrogen content (12.5% by weight), is considered to be promising as a source of hydrogen. Hydrazine is reported to be capable of being decomposed into nitrogen and hydrogen by catalytic reactions. For example, Patent Literature 4 listed below discloses a method for generating hydrogen that comprises contacting hydrazine or a derivative thereof with a metal capable of catalyzing the generation of hydrogen, such as nickel, cobalt, iron, copper, palladium, or platinum. However, an investigation of the ability of these metal catalysts to catalyze the generation of hydrogen via decomposition reactions of hydrazine revealed that a sufficient amount of hydrogen is not produced using these catalysts (see Non-Patent Literature 5 below).

Further, Patent Literature 5 discloses a system for producing hydrogen, comprising a decomposer that decomposes ammonia or hydrazine, which is used as a hydrogen source, into nitrogen and hydrogen, and supplies them into fuel cells. However, Patent Literature 5 does not disclose the details of a method for generating hydrogen by the decomposition of hydrazine.

Patent Literature 6 and 7 disclose methods for generating hydrogen by contacting an aqueous hydrazine solution with a catalyst comprising rhodium supported on a support containing alumina or silica. However, according to these methods, hydrogen is not produced from hydrazine at a high yield, resulting in an insufficient amount of hydrogen.

Citation List

Patent Literature

PTL 1: Japanese Unexamined Patent Publication No. 2001-19401
PTL 2: Japanese Unexamined Patent Publication No. 2002-241102
PTL 3: Japanese Unexamined Patent Publication No. 2006-213563
PTL 4: Japanese Unexamined Patent Publication No. 2004-244251
PTL 5: Japanese Unexamined Patent Publication No. 2003-40602
PTL 6: Japanese Unexamined Patent Publication No. 2007-269514
PTL 7: Japanese Unexamined Patent Publication No. 2007-269529 Non-Patent Literature
NPTL 1: S. C. Amendola et al., International Journal of Hydrogen Energy, 25 (2000), 969-975
NPTL 2: Z. P. Li et al., Journal of Power Sources, 126 (2004), 28-33
NPTL 3: M. Chandra, Q. Xu, Journal of Power Sources, 156 (2006), 190-194
NPTL 4: Q. Xu, M. Chandra, Journal of Power Sources, 163 (2006), 364-370
NPTL 5: S. K. Singh, X.-B. Zhang, Q. Xu, J. Am. Chem. Soc., 131 (2009), 9894-9895

SUMMARY OF THE INVENTION

Technical Problem

The present invention has been made in view of the foregoing problems in the prior art. A principal object of the invention is to provide a method for generating hydrogen that utilizes the decomposition reaction of hydrazine, the method being capable of generating hydrogen with high selectivity, high efficiency, and low cost.

Solution to Problem

The present inventors conducted extensive research to achieve the foregoing object. Consequently, the inventors found that, when hydrazine or a hydrate thereof is used as a hydrogen source, the use of a composite metal of iron and nickel, in particular, a composite metal of iron and nickel in a nano-size ultrafine particle state as a catalyst enables hydrogen to be generated with extremely high selectivity, high efficiency, and low cost, as compared to the use of previously known metal catalysts. The present invention has been accomplished based on this finding.

In summary, the invention provides the following catalysts for generating hydrogen and methods for generating hydrogen.

1. A catalyst for generating hydrogen, comprising a composite metal of iron and nickel, the catalyst being used in a decomposition reaction of at least one compound selected from the group consisting of hydrazine and hydrates thereof.

2. The catalyst for generating hydrogen according to Item 1, wherein the composite metal of iron and nickel is an alloy, intermetallic compound, or solid solution of iron and nickel.

3. The catalyst for generating hydrogen according to Item 1 or 2, wherein the composite metal of iron and nickel contains 25 to 75% by mol of iron.

4. The catalyst for generating hydrogen according to any one of Items 1 to 3, wherein the composite metal of iron and nickel is composed of ultrafine particles having a particle size of 1 to 100 nm.

5. A method for generating hydrogen comprising contacting the catalyst for generating hydrogen recited in any one of Items 1 to 4 with at least one compound selected from the group consisting of hydrazine and hydrates thereof.

6. The method for generating hydrogen according to Item 5, wherein the hydrogen generation reaction is conducted in an alkaline aqueous solution.

7. A method for supplying hydrogen to a fuel cell, comprising supplying hydrogen generated by the method recited in Item 5 or 6 as a hydrogen source to a fuel cell.

DETAILED DESCRIPTION OF THE INVENTION

The present invention is described in detail below.

In the method for generating hydrogen of the invention, at least one compound selected from the group consisting of hydrazine represented by the chemical formula $H_2NNH_2$ and hydrates thereof is used as a hydrogen source. Hydrazine (including hydrazine anhydrides and monohydrates thereof) is a known compound and is liquid at room temperature.

Generally, the decomposition of hydrazine using a catalyst is believed to proceed according to the complete decomposition reaction of hydrazine represented by Reaction Equation (1) below, whereby hydrogen and nitrogen are produced, or according to the partial decomposition reaction of hydrazine represented by Reaction Equation (2) below, whereby ammonia and nitrogen are produced:

$$N_2H_4 \rightarrow N_2 + 2H_2 \quad (1)$$

$$3N_2H_4 \rightarrow N_2 + 4NH_3 \quad (2)$$

Non-Patent Literature 5 mentioned above relates to the decomposition reaction of hydrazine in the presence of a rhodium catalyst at room temperature, revealing that, when the reaction is catalyzed by rhodium metal, the partial decomposition reaction of hydrazine represented by Reaction Equation (2) proceeds preferentially relative to the complete decomposition reaction of hydrazine represented by Reaction Equation (1), producing large quantities of ammonia. Non-Patent Literature 5 also states that, when other metal catalysts, such as platinum, palladium, nickel, copper, and iron, are used, the decomposition reaction of hydrazine does not proceed; whereas when metal catalysts such as cobalt, ruthenium, iridium, and the like are used, the partial decomposition reaction of hydrazine proceeds predominantly, although the complete decomposition reaction of hydrazine also proceeds slightly, producing large quantities of ammonia.

Furthermore, the present inventors' research has shown that, when, for example, a composite metal of iron and copper, a composite metal of cobalt and nickel, a composite metal of copper and cobalt, or a composite metal of nickel and copper is used as a catalyst, no improvement is observed in selectivity for the hydrogen generation reaction via the complete decomposition of hydrazine.

In contrast, when the composite metal of iron and nickel is used as a catalyst in the present invention, the partial decomposition reaction that produces ammonia is suppressed, and the complete decomposition reaction that produces hydrogen proceeds highly selectively.

In particular, when the decomposition reaction of hydrazine is conducted in an aqueous solution containing a hydroxide of an alkali metal or alkaline earth metal, such as sodium hydroxide, in the presence of the composite metal of iron and nickel, the selectivity of the complete decomposition reaction that produces hydrogen is greatly improved.

The catalyst comprising the composite metal of iron and nickel, and the method for generating hydrogen using the catalyst are described in detail below.

Catalyst Comprising Composite Metal of Iron and Nickel

The composite metal of iron and nickel used as the catalyst in the method for generating hydrogen in the present invention needs to be a composite metal wherein iron and nickel are closely correlated, rather than a simple mixture of iron and nickel. Specific examples of such composite metals include alloys, intermetallic compounds, and solid solutions.

As described above, when iron or nickel is singly used as a catalyst, the decomposition reaction of hydrazine does not proceed at room temperature. The catalyst composed of nickel alone exhibits activity when the temperature is raised to about 50° C.; however, the partial decomposition reaction of hydrazine proceeds predominantly, producing large quantities of ammonia. Furthermore, a mere physical mixture of iron and nickel does not improve the selectivity of the complete decomposition reaction of hydrazine compared to the case where nickel is used alone.

In contrast, when a composite metal of iron and nickel is used as a catalyst, surprisingly, the complete hydrazine decomposition reaction represented by Reaction Equation (1) above proceeds with high selectivity, enabling hydrogen to be generated with extremely high efficiency.

The proportions of iron and nickel in the composite metal may be such that the proportion of Fe based on the total molar amount of Fe and Ni is about 0.1 to 90% by mol. When the proportion of Fe is within such a range, the composite metal of iron and nickel shows higher selectivity for the hydrogen generation reaction via the complete decomposition reaction of hydrazine compared to the case where iron is used alone. Particularly, when the proportion of Fe is within a range of about 25 to 75% by mol, the complete decomposition reaction of hydrazine proceeds with remarkably high selectivity. More particularly, when the proportion of Fe is 50% by mol, i.e., the molar ratio between Fe and Ni is Fe:Ni=1:1, the complete decomposition reaction of hydrazine proceeds with extremely high selectivity, enabling hydrogen to be efficiently generated.

The size of the composite metal of iron and nickel is not particularly limited, and when the composite metal is composed of ultrafine nanoparticles having a particle size of about 1 to 100 nm, a high activity for the complete decomposition reaction of hydrazine is observed and hydrogen can be generated with high selectivity. In this case, the particle size of the composite metal is determined by the measurement value obtained by observation using an electron microscope. In the case of particles with an undefined form, the particle size is the length of the longest-axis portion.

A composite metal of iron and nickel can be produced by any suitable method, including, but not limited to: adding a reducing agent to an aqueous solution containing an iron compound and a nickel compound to reduce the iron and nickel ions to metals, thereby producing a desired composite metal of iron and nickel. Other usable methods include adding a reducing agent to an aqueous solution containing an iron compound to reduce the iron ions and adding a nickel compound thereto, followed by further reduction; or adding a reducing agent to an aqueous solution containing a nickel compound to reduce the nickel ions and adding an iron compound thereto, followed by further reduction. Particularly, a highly uniform metal catalyst can be obtained by adding a reducing agent to an aqueous solution containing iron and nickel compounds to reduce the iron and nickel ions. The iron compound and nickel compound used in these methods are not particularly limited as long as they are soluble in solvents. Examples of usable compounds include chloride, nitrate, sulfate, and like metal salts of iron or nickel, and various metal complexes thereof.

There is no limitation to the reducing agent for use in reducing these iron and nickel compounds as long as they can reduce the iron and nickel compounds. Examples of such reducing agents include, but are not limited to, sodium tetrahydroborate and hydrazine itself.

In particular, a method comprising adding a reducing agent to an aqueous solution containing an iron compound and a nickel compound to reduce the iron and nickel ions to metals while stirring under the presence of a surfactant, polymeric protectant, and like dispersion stabilizer can suppress the agglomeration of the resulting composite metals, thereby stably obtaining a composite metal of iron and nickel in the form of nano-size ultrafine particles. The composite metal in the form of ultrafine particles produced by this method exhibits a high activity for the hydrogen generation reaction via the complete decomposition reaction of hydrazine, allowing hydrogen to be generated with high selectivity. There is no particular limitation to the types of the surfactant and polymer protectant used in this method as long as they can be uniformly dissolved in a solution containing iron and nickel ions. In particular, when hexadecyltrimethylammonium bromide, hexadecyltrimethylammonium chloride, or like surfactant; or polyvinylpyrrolidone, polyvinyl alcohol, polycyclodextrin, gelatin, or like polymeric protectant is used, a uniform composite metal having a nanosize can be obtained.

The concentration of the dispersion stabilizer, such as a surfactant, polymeric protectant, or the like, in the solution used in this method is not particularly limited, and may be about 0.001 to 5% by weight. The concentrations of iron compound and nickel compound are also not particularly limited as long as a uniform solution can be obtained. For example, the concentrations of the iron compound and nickel compound may each be within the range of 0.001 to 5% by weight. Note that the proportions of the iron compound and nickel compound may be the same as those in the target composite metal.

The amount of reducing agent used is not particularly limited, and the reducing agent may be used in an amount of one or more equivalents, preferably 1 to 5 equivalents of the reducing agent per equivalent of the total amount of the iron compound and nickel compound.

The solution temperature at which the composite metal is produced by reducing the iron compound and the nickel compound is not particularly limited, and is generally about 20 to 70° C.

The composite metal of iron and nickel may further contain other metals, as long as the catalytic activity is not adversely affected.

The composite metal of iron and nickel may also be used as a supported catalyst on a support containing silica, alumina, zirconia, activated carbon, or the like. Such a supported catalyst can be produced by any suitable method, including, but not limited to, dispersing a support in a solution containing an iron compound and nickel compound, and reducing the iron and nickel compounds in the dispersion. The amount of the support is not particularly limited. For example, based on the total amount of the support and composite metal of iron and nickel, the amount of the composite metal is preferably about 0.1 to 20% by weight, more preferably about 0.5 to 10% by weight, and still more preferably about 1 to 5% by weight.

Method for Generating Hydrogen

In the method for generating hydrogen of the invention, at least one compound selected from the group consisting of hydrazine and hydrates thereof is used as a hydrogen source. The hydrazine and hydrates thereof are not limited to particular types, and commercially available products can generally be used as they are. In addition to hydrazine and hydrates thereof, other components may also be included as long as they do not adversely affect the generation of hydrogen.

Among the above-mentioned compounds, when hydrazine anhydride ($H_2NNH_2$) is used as a starting material, hydrogen is generated in an amount of 12.5% by weight relative to the hydrazine anhydride, resulting in a high efficiency for hydrogen generation; however, the ignitability of hydrazine anhydride poses safety problems. On the other hand, when hydrazine monohydrate ($H_2NNH_2.H_2O$) is used as a hydrogen source, hydrogen is generated in an amount of 8.0% by weight relative to the hydrazine monohydrate, still resulting in a high efficiency for hydrogen generation, although the efficiency is slightly lower than that provided by using hydrazine anhydride as a starting material. Moreover, high safety is ensured. Therefore, in consideration of safety, hydrazine monohydrate or an aqueous solution thereof obtained by further diluting hydrazine monohydrate in water may be used. Particularly, in consideration of both safety and hydrogen generation efficiency, an aqueous solution containing the hydrazine at a concentration of about 40 to 64% by weight is preferably used in the invention.

The method for generating hydrogen of the present invention can be conducted by contacting at least one compound selected from the group consisting of hydrazine and hydrates thereof used as a hydrogen source with a catalyst comprising a composite metal of iron and nickel as described above. There is no particular limitation to the method used for contacting. For example, hydrazine and a catalyst may be added to a reaction vessel and mixed. Another usable method is to introduce an aqueous solution of hydrazine into a reactor filled with a catalyst, and pass the hydrazine solution through a catalyst bed.

The amount of the catalyst comprising a composite metal of iron and nickel used is not particularly limited. The amount thereof can be selected from a wide range of about 0.0001 to 10 mol per mole of the at least one compound selected from the group consisting of hydrazine and hydrates thereof. Particularly, in consideration of the balance between the reaction rate, the catalyst cost, and the like, the amount of the composite metal may preferably be about 0.01 to 0.5 mol per mole of the at least one compound selected from the group consisting of hydrazine and hydrates thereof. In the case of the method that includes passing the hydrazine or a hydrate thereof through a catalyst bed, the amount of the catalyst used in the catalyst bed may be determined in consideration of the flow rate and contact time of the solution of the hydrazine or a hydrate thereof.

In the present invention, when at least one compound selected from the group consisting of hydrazine and hydrates thereof is used in a form of an aqueous solution, it is particularly preferable that the solution be used as an alkaline aqueous solution. This improves the selectivity for the complete decomposition reaction of hydrazine, allowing hydrogen to be efficiently generated. The aqueous solution can be made alkaline by, for example, adding at least one compound selected from the group consisting of alkali metal hydroxides and alkaline earth metal hydroxides to an aqueous solution containing at least one compound selected from the group consisting of hydrazine and hydrates thereof. Examples of usable alkali metal hydroxides include sodium hydroxide, potassium hydroxide, and the like. Examples of usable alkaline earth metal hydroxides include calcium hydroxide, magnesium hydroxide, and the like. These compounds may be used singly or in a combination of two or more. The concentration of the at least one compound selected from the group consisting of alkali metal hydroxides and alkaline earth metal hydroxides is not particularly limited, and the concentration of the total thereof is generally about 0.001 to 5 mol/L, and more preferable about 0.01 to 2 mol/L.

The reaction temperature of the hydrogen generation reaction is not particularly limited, but is preferably about 0 to 90° C., and more preferably about 30 to 80° C.

The pressure and atmosphere in the reaction system during the reaction can be selected as desired.

Method for Utilizing Generated Hydrogen

According to the method of the invention, the hydrogen generation reaction by the decomposition of hydrazine proceeds with high selectivity, enabling hydrogen to be efficiently generated.

The generated hydrogen can, for example, be directly supplied to fuel cells as a fuel. Particularly, because the method for generating hydrogen of the invention can generate hydrogen at around room temperature, and can control the rate of hydrogen generation, the amount of hydrogen generated, and the like, the method of the invention is highly usable for supplying hydrogen to fuel cells for automobiles, portable fuel cells for, for example, cellular phones and personal computers, and the like.

The generated hydrogen can be stored by, for example, collecting it in a vessel filled with a hydrogen storage alloy. The pressure of the generated hydrogen in the system can also be controlled by adjusting the temperature of the hydrogen storage alloy according to the equilibrium pressure-temperature relationship.

Advantageous Effects of Invention

According to the method for generating hydrogen of the invention, hydrogen gas can be efficiently generated under controllable conditions without heating to a high temperature.

Moreover, the catalyst can used in the process for producing hydrogen with high selectivity without using any precious metal, thus the catalyst can be a low-cost one for generating hydrogen.

Hydrogen gas generated by the method of the invention is highly usable as a fuel for fuel cells for automobiles, portable fuel cells, and the like.

DESCRIPTION OF EMBODIMENTS

The present invention will be described in greater detail below, referring to Examples and Comparative Examples.

Example 1

$NiCl_2.6H_2O$ (0.024 g), $FeSO_4.7H_2O$ (0.028 g), hexadecyltrimethylammonium bromide (CTAB, 95%) (0.100 g), and water (2.5 mL) were placed in a 30-mL two-necked flask, and the mixture was ultrasonically stirred for 5 minutes, followed by heating at 50° C. for 5 minutes. An $NaBH_4$ (0.010 g) aqueous solution (1.5 mL) was subsequently added, and the reactor was vigorously shaken for 5 minutes, thereby forming an NiFe nanoparticle catalyst.

Figure 1:
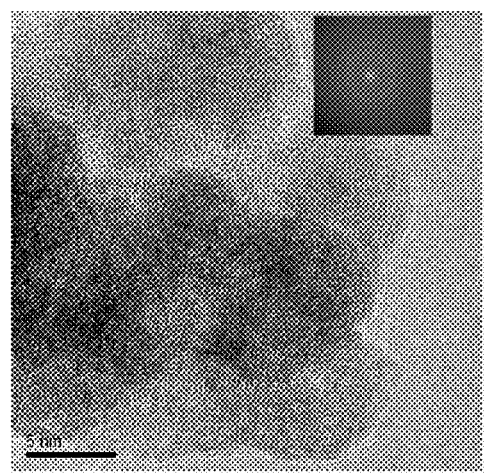
FIG. 1 shows a transmission electron microscope (TEM) image of the catalyst particles obtained in Example 1.

A transmission electron microscope (TEM) image of the NiFe nanoparticle catalyst obtained is shown in FIG. 1. As is clear from FIG. 1, the catalyst was composed of ultrafine particles having a particle size of about 10 nm.

Figure 2:
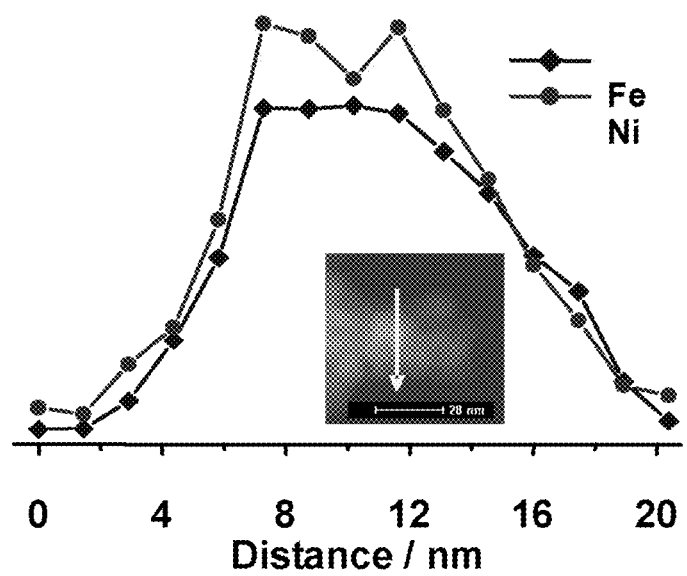
FIG. 2 shows a high-angle annular dark-field (scanning transmission electron microscope) (HAADF-STEM) image and EDS line scan spectra of the catalyst particles obtained in Example 1.

FIG. 2 shows a high-angle annular dark-field (scanning transmission electron microscope) (HAADF-STEM) image of the NiFe nanoparticle catalyst; it shows the EDS line scan spectral intensities of Fe and Ni measured along the line shown in the figure. It can be clearly seen from the EDS line scan spectra shown in FIG. 2 that Fe and Ni are present in the same positions, thereby forming an alloy in which Fe and Ni coexist at the atomic level, rather than being present as separate metal particles.

Next, hydrazine monohydrate ($H_2NNH_2.H_2O$, 99%) (0.1 mL, 1.97 mmol) was added to the two-necked flask via a syringe, and stirring was continued at 70° C. Released gases were passed through a trap containing 1.0 M hydrochloric acid, where ammonia was absorbed; subsequently, only hydrogen and nitrogen were introduced into a gas burette, and the amount of the released gases was measured. After 10, 20, 40, 60, 80, 120, 200, 280, 320, and 360 minutes from the beginning of stirring, 8 mL, 16 mL, 28 mL, 40 mL, 51 mL, 69 mL, 101 mL, 117 mL, 121 mL, and 121 mL, respectively, of released gases were observed.

Figure 3:
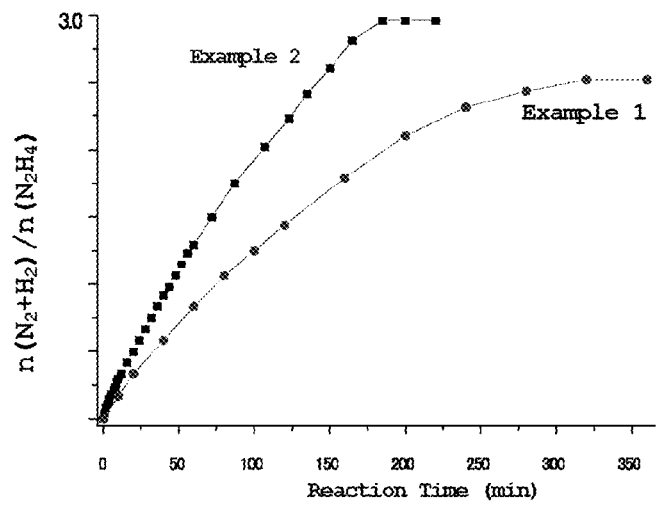
FIG. 3 is a graph showing the relationship between the reaction time and the molar ratio of released gases relative to hydrazine monohydrate, measured in each of Examples 1 and 2.
Figure 4:
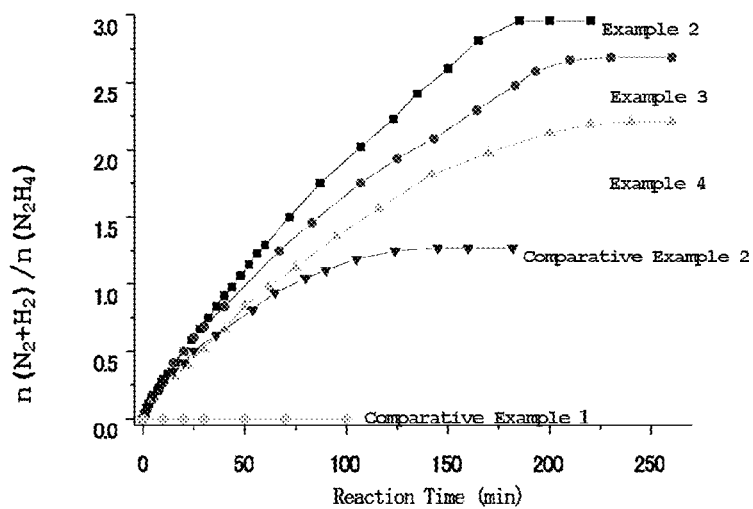
FIG. 4 is a graph showing the relationship between the reaction time and the molar ratio of released gases relative to hydrazine monohydrate, measured in each of Examples 2 to 4, Comparative Example 1, and Comparative Example 2.

FIG. 3 is a graph showing the relationship between the reaction time and the molar ratio of the released gases relative to hydrazine monohydrate used as a starting material. The graph of FIG. 3 also shows the results of Example 2 described below.

Mass spectral (MS) analysis confirmed that the released gases were hydrogen and nitrogen. The amount of the released gases was 2.5 times the molar amount of the hydrazine that was used as a starting material. This amount of released gases corresponds to that having 81% selectivity for the hydrogen generation reaction via the complete decomposition of hydrazine.

Furthermore, gas generated by the above-described method was directly introduced into a solid polymer fuel cell. As a result, normal operation of the fuel cell was confirmed.

Comparative Example 1

$FeSO_4.7H_2O$ (0.056 g), hexadecyltrimethylammonium bromide (CTAB, 95%) (0.100 g), and water (2.5 mL) were placed in a 30-mL two-necked flask, and the mixture was ultrasonically stirred for 5 minutes, followed by heating at 50° C. for 5 minutes. An $NaBH_4$ (0.010 g) aqueous solution (1.5 mL) was subsequently added, and the reactor was vigorously shaken for 5 minutes, thereby forming an Fe nanoparticle catalyst.

NaOH (0.080 g) was then added to the solution obtained above and the reactor was shaken to dissolve the NaOH. Hydrazine monohydrate ($H_2NNH_2.H_2O$, 99%) (0.1 mL, 1.97 mmol) was added to the two-necked flask via a syringe, and stirring was performed at 70° C. for more than 100 minutes. However, no gas release was observed.

Comparative Example 2

$NiCl_2.6H_2O$ (0.048 g), hexadecyltrimethylammonium bromide (CTAB, 95%) (0.100 g), and water (2.5 mL) were placed in a 30-mL two-necked flask, and the mixture was ultrasonically stirred for 5 minutes, followed by heating at 50° C. for 5 minutes. An $NaBH_4$ (0.010 g) aqueous solution (1.5 mL) was subsequently added, and the reactor was vigorously shaken for 5 minutes, thereby forming an Ni nanoparticle catalyst.

Subsequently, NaOH (0.080 g) was added to the solution obtained above and the reactor was shaken to dissolve the NaOH. Hydrazine monohydrate ($H_2NNH_2.H_2O$, 99%) (0.1 mL, 1.97 mmol) was added to the two-necked flask via a syringe, and stirring was continued at 70° C. Released gases were passed through a trap containing 1.0 M hydrochloric acid, where ammonia was absorbed; subsequently, only hydrogen and nitrogen were introduced into a gas burette, and the amount of the released gases was measured. After 5, 10, 20, 54, 80, 105, 124, and 182 minutes from the beginning of stirring, 8 mL, 13 mL, 20 mL, 39 mL, 50 mL, 57 mL, 60 mL, and 61 mL, respectively, of released gases were observed.

Mass spectral (MS) analysis confirmed that the released gases were hydrogen and nitrogen. The amount of released gases was 1.3 times the molar amount of the hydrazine that was used as a starting material. This amount of released gases corresponds to that having 36% selectivity for the hydrogen generation reaction via the complete decomposition of hydrazine.

Example 2

$NiCl_2.6H_2O$ (0.024 g), $FeSO_4.7H_2O$ (0.028 g), hexadecyltrimethylammonium bromide (CTAB, 95%) (0.100 g), and water (2.5 mL) were placed in a 30-mL two-necked flask, and the mixture was ultrasonically stirred for 5 minutes, followed by heating at 50° C. for 5 minutes. An $NaBH_4$ (0.010 g) aqueous solution (1.5 mL) was subsequently added, and the reactor was vigorously shaken for 5 minutes, thereby forming an NiFe nanoparticle catalyst.

NaOH (0.080 g) was then added to the solution obtained above and the reactor was shaken to dissolve the NaOH. Hydrazine monohydrate ($H_2NNH_2.H_2O$, 99%) (0.1 mL, 1.97 mmol) was added to the two-necked flask via a syringe, and stirring was continued at 70° C. Released gases were passed through a trap containing 1.0 M hydrochloric acid, where ammonia was absorbed; subsequently, only hydrogen and nitrogen were introduced into a gas burette, and the amount of the released gases was measured. After 10, 20, 32, 60, 107, 150, 185, and 220 minutes from the beginning of stirring, 14 mL, 24 mL, 36 mL, 62 mL, 97 mL, 125 mL, 142 mL, and 142 mL, respectively, of released gases were observed.

Mass spectral (MS) analysis confirmed that the released gases were hydrogen and nitrogen. The amount of released gases was 3.0 times the molar amount of the hydrazine that was used as a starting material. This amount of released gases corresponds to that having 100% selectivity for the hydrogen generation reaction via the complete decomposition of hydrazine.

Furthermore, gas generated by the above-described method was directly introduced into a solid polymer fuel cell. As a result, normal operation of the fuel cell was confirmed.

As is clear from FIG. 3, a comparison of the results of Example 1 and those of Example 2 reveals that Example 2 achieves a significantly improved reaction rate and selectivity for hydrogen generation by the addition of NaOH.

Example 3

$NiCl_2.6H_2O$ (0.036 g), $FeSO_4.7H_2O$ (0.014 g), hexadecyltrimethylammonium bromide (CTAB, 95%) (0.100 g), and water (2.5 mL) were placed in a 30-mL two-necked flask, and the mixture was ultrasonically stirred for 5 minutes, followed by heating at 50° C. for 5 minutes. An $NaBH_4$ (0.010 g) aqueous solution (1.5 mL) was subsequently added, and the reactor was vigorously shaken for 5 minutes, thereby forming an $Ni_3Fe$ nanoparticle catalyst.

NaOH (0.080 g) was then added to the solution obtained above and the reactor was shaken to dissolve the NaOH. Hydrazine monohydrate ($H_2NNH_2.H_2O$, 99%) (0.1 mL, 1.97 mmol) was added to the two-necked flask via a syringe, and stirring was continued at 70° C. Released gases were passed through a trap containing 1.0 M hydrochloric acid, where ammonia was absorbed; subsequently, only hydrogen and nitrogen were introduced into a gas burette, and the amount of the released gases was measured. After 5, 10, 20, 40, 83, 125, 164, and 193, 230, and 260 minutes from the beginning of stirring, 7 mL, 13 mL, 24 mL, 40 mL, 70 mL, 93 mL, 110 mL, 124 mL, 129 mL, and 129 mL, respectively, of released gases were observed.

Mass spectral (MS) analysis confirmed that the released gases were hydrogen and nitrogen. The amount of the released gases was 2.7 times the molar amount of the hydrazine that was used as a starting material. This amount of released gases corresponds to that having 89% selectivity for the hydrogen generation reaction via the complete decomposition of hydrazine.

Furthermore, gas generated by the above-described method was directly introduced into a solid polymer fuel cell. As a result, normal operation of the fuel cell was confirmed.

Example 4

$NiCl_2.6H_2O$ (0.012 g), $FeSO_4.7H_2O$ (0.042 g), hexadecyltrimethylammonium bromide (CTAB, 95%) (0.100 g), and water (2.5 mL) were placed in a 30-mL two-necked flask, and the mixture was ultrasonically stirred for 5 minutes, followed by heating at 50° C. for 5 minutes. An $NaBH_4$ (0.010 g) aqueous solution (1.5 mL) was subsequently added, and the reactor was vigorously shaken for 5 minutes, thereby forming an $NiFe_3$ nanoparticle catalyst.

NaOH (0.080 g) was then added to the solution obtained above and the reactor was shaken to dissolve the NaOH.

Hydrazine monohydrate ($H_2NNH_2.H_2O$, 99%) (0.1 mL, 1.97 mmol) was added to the two-necked flask via a syringe, and stirring was continued at 70° C. Released gases were passed through a trap containing 1.0 M hydrochloric acid, where ammonia was absorbed; subsequently, only hydrogen and nitrogen were introduced into a gas burette, and the amount of the released gases was measured. After 5, 22, 40, 62, 95, 142, 170, 200, 240, and 260 minutes from the beginning of stirring, 7 mL, 19 mL, 32 mL, 47 mL, 65 mL, 87 mL, 95 mL, 102 mL, 106 mL, and 106 mL, respectively, of released gases were observed.

Mass spectral (MS) analysis confirmed that the released gases were hydrogen and nitrogen. The amount of the released gases was 2.2 times the molar amount of the hydrazine that was used as a starting material. This amount of released gases corresponds to that having 71% selectivity for the hydrogen generation reaction via the complete decomposition of hydrazine.

Furthermore, gas generated by the above-described method was directly introduced into a solid polymer fuel cell. As a result, normal operation of the fuel cell was confirmed.

Figure 5:
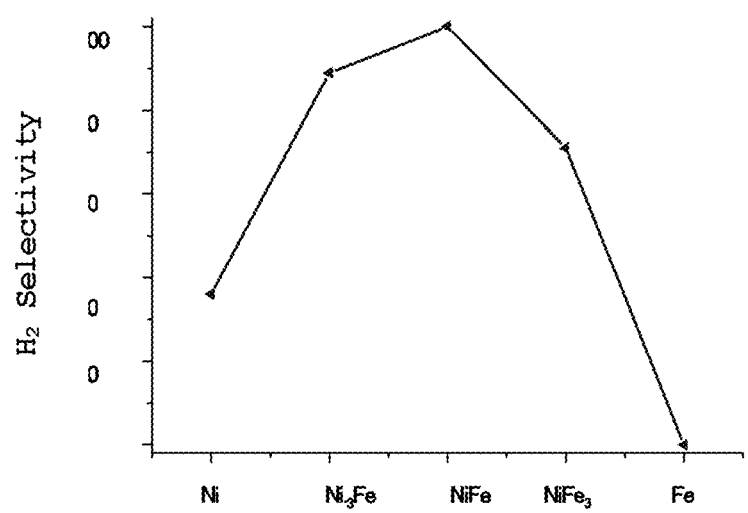
FIG. 5 is a graph showing the relationship between the composition of iron-nickel nanoparticle catalysts and the selectivity for the hydrogen generation reaction.

FIG. 5 is a graph showing the relationship between the compositions of NiFe nanoparticle catalyst obtained based on the results of Examples 2 to 4 and the selectivity for the hydrogen generation reaction.

This result confirms that when the proportion of Fe relative to the total amount of Fe and Ni is within a range of about 0.1 to 90% by mol, more preferably about 25 to 75% by mol, the selectivity for the hydrogen generation reaction via the complete decomposition reaction of hydrazine can be improved. Maximum selectivity is achieved when the proportion of Fe is 50% by mol.

The invention claimed is:

1. A method for generating hydrogen comprising contacting a catalyst for generating hydrogen with at least one compound selected from the group consisting of hydrazine and hydrates thereof, wherein the catalyst comprises a composite metal of iron and nickel, and the composite metal of iron and nickel contains 25 to 75% by mol of iron.

2. The method for generating hydrogen according to claim 1, wherein the hydrogen generation reaction is conducted in an alkaline aqueous solution.

3. A method for supplying hydrogen to a fuel cell, comprising supplying hydrogen generated by the method recited in claim 1 as a hydrogen source to a fuel cell.

4. The method for generating hydrogen according to claim 1, wherein the composite metal of iron and nickel is an alloy, intermetallic compound, or solid solution of iron and nickel.

5. The method for generating hydrogen according to claim 2, wherein the composite metal of iron and nickel is an alloy, intermetallic compound, or solid solution of iron and nickel.

6. The method for generating hydrogen according to claim 1, wherein the composite metal of iron and nickel is composed of ultrafine particles having a particle size of 1 to 100 nm.

7. The method for generating hydrogen according to claim 2, wherein the composite metal of iron and nickel is composed of ultrafine particles having a particle size of 1 to 100 nm.

8. The method for generating hydrogen according to claim 4, wherein the composite metal of iron and nickel is composed of ultrafine particles having a particle size of 1 to 100 nm.

* * * * *